United States Patent
Vagin et al.

[15] 3,700,364
[45] Oct. 24, 1972

[54] APPARATUS FOR GRANULATING MELTS

[72] Inventors: Alexei Alexeevich Vagin, Dzerzhinsk; Stanislav Valerlevich Yablonsky, Kazan; Pete Stepanovich Voloshin, Dzerzhinsk; Nikolai Gregorievich Sharov, Dzerzhinsk; Viktor Ivanovich Shiborin, Dzerzhinsk; Vladimir Efimovich Novakowsky, Dzerzhinsk; Grigory Vasilievich Kolpakov, Dzerzhinsk; Mark Efremovich Ivanov, Moscow; Viktor Mikhailovich Lindin, Moscow; Danill Yakovlevich Lipsky, Moscow, all of U.S.S.R.

[73] Assignee: Dzerzhinsky Filial Nauchno-Issledovatelskogo i Konstruktorskogo Instituta Khimicheskogo Mashinostroenia, Dzerzhinsk, U.S.S.R.

[22] Filed: Dec. 23, 1969
[21] Appl. No.: 887,640

[30] Foreign Application Priority Data

Dec. 23, 1968   U.S.S.R. ............... 1291391

[52] U.S. Cl. ................. 425/7, 264/13, 425/73, 425/104
[51] Int. Cl. ................. B22d 23/08, B29c 23/00
[58] Field of Search .......... 18/2.5 R, 2.7, 2.4, 2.5 RR, 18/1 A, 1 B; 264/13

[56] References Cited

UNITED STATES PATENTS

| 3,020,585 | 2/1962 | Berthon et al. ...... 18/2.5 RR X |
| 3,446,877 | 5/1969 | Endler .................... 264/13 X |

Primary Examiner—Robert L. Spicer, Jr.
Attorney—Waters, Roditi, Schwartz & Nissen

[57] ABSTRACT

An apparatus for granulating melts comprising a chamber with a perforated bottom provided with branch pipes for supplying the melt into this chamber, in which the outlet tips of the branch pipes are directed relative to the perforated bottom so as to provide a continuous rotary motion of the melt above the inner surface of the bottom.

5 Claims, 4 Drawing Figures

PATENTED OCT 24 1972          3,700,364

APPARATUS FOR GRANULATING MELTS

The present invention relates to apparatus for use in chemical industries and, more particularly, has reference to apparatus for granulating melts. The proposed apparatus can be most effectively used for granulating ammonium nitrate and carbamide.

Known in the art are devices for granulating melts comprising a chamber with a perforated bottom equipped with a branch pipe for supplying the melt therein.

An apparatus for granulating melts is usually mounted in the upper structure of a granulating tower and the melt is fed into the chamber of the apparatus from a pressure tank. Under the action of a static head, the melt flows from the perforations in the bottom of the chamber as a plurality of sprays disintegrating into droplets which solidify during their free fall against a countercurrent stream of air, forced through the granulating tower from below, and are collected on the tower bottom in the form of globular granules.

In this case, under the cooling action of the air countercurrent, a portion of the melt is cooled below the melting point in some zones of the apparatus chamber, for example within the peripheral zone thereof and directly near the inner surface of the bottom resulting in a partial crystallization of the melt in these zones followed by clogging of the bottom perforations by the crystals falling out from the melt.

The clogging of the perforated bottom of the chamber contributes to a decrease in the uniformity of the product in granulometric composition. Furthermore, in case of intensive clogging, it is necessary to frequently stop the process for cleaning the perforations or for replacing the granulating apparatus. This fact considerably complicates the operation of the granulating apparatus and reduces its efficiency.

An object of the invention is to provide an apparatus for granulating melts which has a simple construction and provides for elimination of the melt crystallization within the chamber thus insuring a prolonged continuous operation of the apparatus and increasing the efficiency of the granulating plant.

This object is attained by providing an apparatus for granulating melts comprising a chamber with a perforated bottom equipped with branch pipes for supplying the melt into this chamber in which, according to the invention, there is a melt collector connected with branch pipes for supplying the melt into the chamber, the outlet ends of said pipes extending into the chamber in one direction, essentially tangentially relative to the side walls of said chamber so as to provide a continuous rotary motion of the melt in the chamber above the surface perforated bottom. The chamber is preferably ring-shaped. It is also advantageous that the apparatus be provided with means for discharging gases from the chamber and for supplying steam into the chamber.

It is advantageous to provide the apparatus with a steam jacket around said chamber.

According to another feature, the collector may be centrally located and connected to the branch pipes by radially extending portions.

It is also a feature of the invention that the branch pipes for supplying the melt in the apparatus be arranged essentially in the same plane.

The aforesaid perforated bottom of the apparatus may moreover advantageously be fixed in the desired position.

It is further advantageous to dispose said collector within a common casing with said chamber, a partition being provided therebetween and carrying said branch pipes.

Other objects and advantages of the invention will be apparent from the following description of a preferred embodiment thereof taken in connection with the accompanying drawings, in which.

Figure 1:
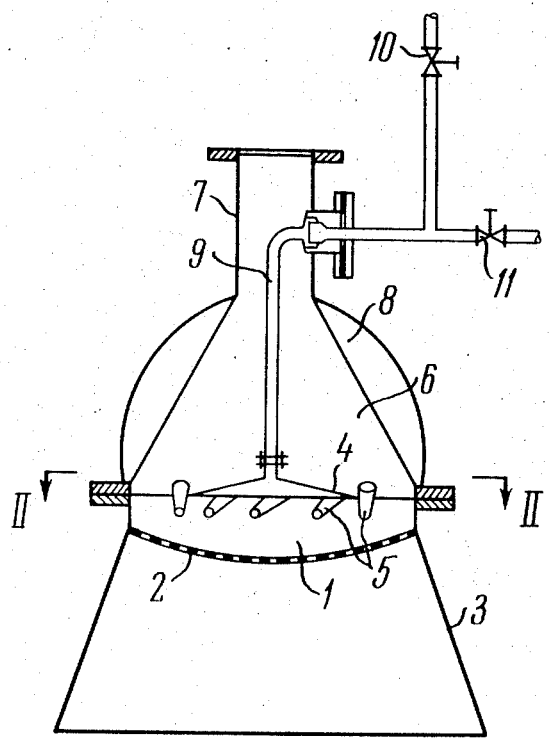
FIG. 1 is a simplified view of a device for granulating melts according to the invention.

One type of apparatus for granulating melts comprises a chamber 1 (FIG. 1) with a horizontal perforated bottom 2 provided with an adapter 3. Mounted on a partition wall 4 at the top of chamber 1 are branch pipes 5 (FIG. 2), which are located at an equal distance one from another and are inclined relative to the bottom 2 (FIG. 1) of the chamber 1 to provide for a rotary motion and extend in one direction tangentially relative to the side walls of the melt in the chamber 1.

The wall 4 separates the chamber 1 from the collector 6 of the apparatus which is provided with a branch pipe 7 for the supply of the melt. The collector 6 is disposed above the chamber 1 and serves as a collector for supplying the melt under pressure into the branch pipes 5. The collector 6 is located inside a chamber 8 which is supplied with steam so that a heat insulating air pad is formed around the collector 6. The chamber 1 is provided with means for discharging gases therefrom during the operation of the apparatus and for supplying it with steam before operation is started, said means comprising a pipe 9 which is connected via an opening in the middle of the partition wall 4 with the chamber 1, said pipe 9 communicating through a valve 10 with the atmosphere and a valve 11 with a steam line (not shown).

The chamber 1 may be ring-shaped and, for example, can be made in the form of a toroid with a perforated bottom, or it may have any other section.

Figure 3:
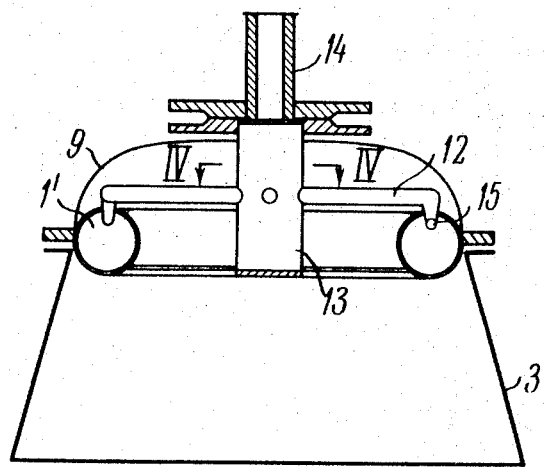
FIG. 3 illustrates another form of the apparatus for granulating melts according to the invention.
Figure 4:
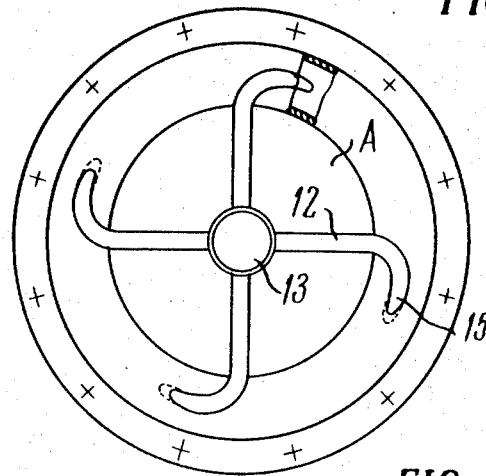
FIG. 4 is a sectional view through line IV—IV in FIG. 3.

The toroidal chamber 1' (FIG. 3) is provided with several radial distributing branch pipes 12 (FIG. 4) connected with a central collector or manifold 13 fed with the melt through an inlet pipe 14 (FIG. 3). The outlet tips 15 of the branch pipes 12 are directed tangentially relative to the walls of the chamber 1' so as to provide a rotary motion of the melt within the chamber 1', the ring shape of the said chamber also assisting in this action.

Such a form of the chamber 1' also makes it possible to use the free central space A limited by the walls of the chamber 1', for example, for inserting therethrough the distributing heads of the devices serving for supplying substances for intensifying the decomposition of the sprays into drops or for dusting and coating the drops with hydrophobic additions during the free fall of these drops.

The proposed apparatus operates as follows.

Figure 2:
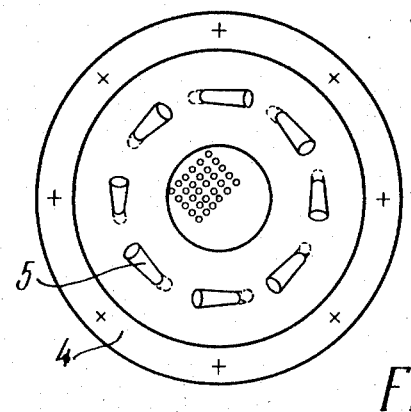
FIG. 2 is a sectional view through line II—II in FIG. 1 with a portion of the partition wall removed.

From the pressure tank (not shown) arranged above the granulating apparatus, the melt is fed into the collector chamber 6 through the inlet 7 (FIG. 1). Through the branch pipes 5 the melt flows into the chamber 1 in which the melt acquires a rotary motion along the perforated bottom 2 due to the tangential posture of the nozzles. By means of the openings of the perforated bottom 2, the whole mass of the melt flowing from the chamber 1 is distributed into a plurality of sprays which disintegrate into droplets which during the free fall in a countercurrent stream of air solidify in the form of globular granules and are collected on the base of the granulating tower.

In this case, due to continuous circulation of the melt in the chamber 1, local zones of overcooling and crystallization of the melt are not formed. The adapter 3 mounted under the perforated bottom 2 produces therein a heating air pad eliminating the contact of the bottom 2 with the flows of cold air and protecting the melt against overcooling.

The gas cavities are removed from the chamber 1 through the pipe 9 and valve 10 and this makes it possible to eliminate the formation of granules with surface cavities and to increase the quality of the finished product as well as to eliminate the scattering of sprays during the penetration of the gases, evolving from the melt, through the perforations of the bottom 2.

The proposed apparatus is characterized by reliability and a long life and provides for a high quality of the granules produced granules with respect to shape and size.

We claim:

1. An apparatus for granulating melts comprising in combination: a chamber including a horizontal perforated bottom; branch pipes for supplying melt into said chamber, said branch pipes being disposed within said chamber to extend in one direction, substantially tangentially relative to the side wall of said chamber so as to provide a continuous rotary motion of the melt above said perforated bottom, and a collector connected with said branch pipes for supplying the melt under pressure into said chamber.

2. An apparatus as claimed in claim 1, in which said chamber is ring-shaped.

3. An apparatus as claimed in claim 1 comprising means to evacuate gases from and introduce steam into said chamber.

4. An apparatus as claimed in claim 1 comprising a steam jacket around said chamber.

5. An apparatus as claimed in claim 1 comprising a casing, said collector being located in said casing along with said chamber, and a partition between said collector and chamber, said branch pipes being mounted in said partition.

* * * * *